United States Patent [19]

Adkins et al.

[11] Patent Number: 4,463,340

[45] Date of Patent: Jul. 31, 1984

[54] ANTI-THEFT CONTROL SYSTEM

[75] Inventors: Joey B. Adkins, Willowick; Jack W. Frantz, Mayfield Heights, both of Ohio

[73] Assignee: Darrell E. Issa, Cleveland, Ohio

[21] Appl. No.: 303,552

[22] Filed: Sep. 18, 1981

[51] Int. Cl.$^3$ .............................................. B60R 25/04
[52] U.S. Cl. ...................................... 340/64; 180/287;
307/10 AT; 340/310 A; 340/825.32; 340/538;
340/543
[58] Field of Search ........... 340/63, 64, 310 R, 310 A,
340/825.32, 825.37, 538, 543, 310 CP; 180/287;
307/10 AT

[56] References Cited

U.S. PATENT DOCUMENTS

| | | | |
|---|---|---|---|
| 3,209,326 | 9/1965 | Heiser | 340/64 X |
| 3,740,713 | 6/1973 | Teich | 340/64 |
| 3,784,839 | 1/1974 | Weber | 307/10 |
| 4,090,089 | 5/1978 | Morello et al. | 340/825.32 |
| 4,123,748 | 10/1978 | Otani | 340/310 A |
| 4,143,368 | 3/1979 | Route et al. | 340/63 X |
| 4,180,043 | 12/1979 | Kawamura | 340/64 X |
| 4,209,709 | 6/1980 | Betton | 307/10 |
| 4,236,594 | 12/1980 | Ramsperger | 180/167 |

FOREIGN PATENT DOCUMENTS 10084 4/1980 European Pat. Off. .

*Primary Examiner*—David L. Trafton
*Attorney, Agent, or Firm*—Fay & Sharpe

[57] ABSTRACT

The anti-theft control system includes a sending module (A) for sending encoded signals on a power line (12) of a vehicle power supply (B). The sending module (A) includes a keyboard (52) on which an authorized user enters his code. If the proper code is entered, a digital encoder (40) produces a preselected encoded signal which is imposed on the power signal by an interface circuit (60). The anti-theft control system further includes a receiving module (C) which receives encoded signals from the power line. The receiving module includes a detector (70) for separating encoded signals from the power signal and a decoder (80) for comparing the received encoded signal with the preselected encoded signal. If the decoder (80) determines that the preselected encoded signal has been received, it enables an ignition control circuit (90) to pass electric power from the vehicle ignition key switch (20) to the vehicle ignition (22). Optionally, an alarm control circuit (100) may enable an alarm a predetermined time determined by delay timer (114), after the vehicle is entered unless the alarm control circuit (100) is disabled by the detector (80).

20 Claims, 4 Drawing Figures

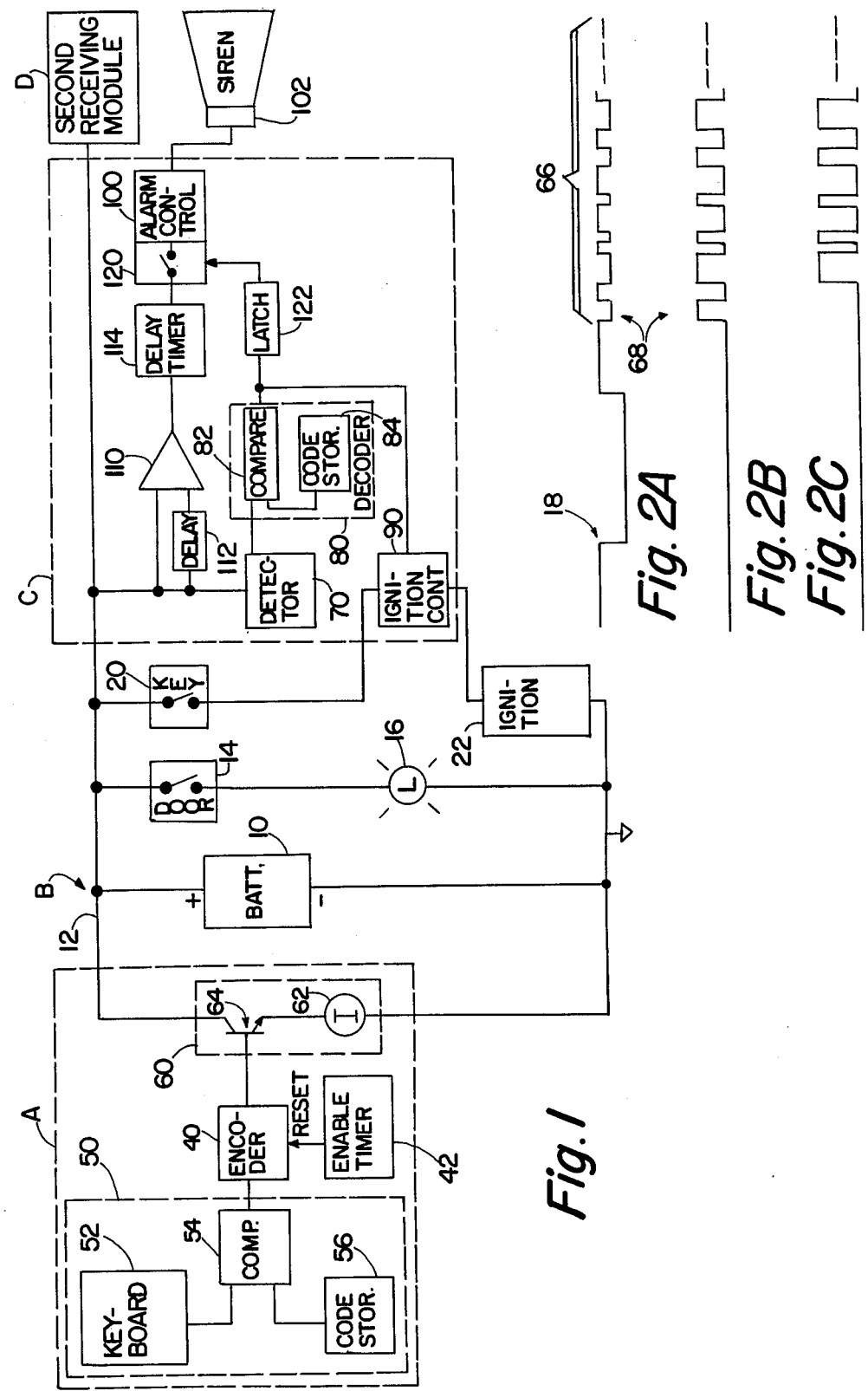

ANTI-THEFT CONTROL SYSTEM

BACKGROUND OF THE INVENTION

This application pertains to the art of control systems for electrically controlled or operated devices including motor vehicles. The invention finds particular application in anti-theft systems for cars, trucks, and other motor vehicles and will be described with particular reference thereto. It is to be appreciated, however, that the invention has other applications including controlling electric vehicles, heavy equipment such as off-road and construction vehicles, controlling machinery such as lathes, punches, compressors, and other machinery to which it is desirable to limit access, or the like.

Heretofore, numerous types of anti-theft systems have been utilized for motor vehicles. Some of these devices have included an ignition control device which is located under the hood for selectively permitting and blocking electrical power to reach the vehicle's ignition system. These systems further include a mechanism for selectively activating the ignition control device such that electrical power is permitted to pass to the ignition. Typically, this means includes a keyboard located on the dashboard into which the operator punches a preselected code. If the proper code is entered, the ignition control circuit is enabled to pass electrical power to the ignition.

One of the problems with the prior art systems is that to connect lead wires between the keyboard and the ignition control circuit, it was necessary to cut a hole through the firewall of the vehicle. The lead wires were threaded through the hole in the firewall to the ignition control circuit. Cutting and threading wires through the firewall is difficult and time consuming. This cutting and threading wires through the firewall is particularly difficult for the do-it-yourself installer who purchases the anti-theft system in a kit.

One solution was to connect a radio transmitter with a keyboard and a radio receiver with the ignition control device. However, radio control systems have inherent drawbacks. In a radio control system, it is possible to receive signals which could inadvertently disarm the system or actuate the alarm from like anti-theft systems in nearby vehicles, garage door openers, electrical storms, stray harmonics of broadcast radio, and the like. Another draw back to the radio controlled systems is maintaining fresh batteries within the transmitter module. Further, FCC licensing may be required of the owner of radio controlled systems.

BRIEF DESCRIPTION OF THE INVENTION

The present invention provides a control system for electrical devices which overcomes the above referenced problems yet is simple to install.

In accordance with the present invention, there is provided a control system for an electrically controlled device which includes an electric power supply having at least one power line on which electric power signals are conveyed. The control system comprises a sending module and a receiving module. The sending module includes an encoding means for supplying a preselected encoded signal, actuating means for selectively actuating the encoding means to produce the encoded signal, and an interface means for imposing the encoded signal on the power signals on the power line. The sending module is operatively connected with the power line to receive operating power therefrom and to supply the encoded signal thereto. The receiving module includes a detecting means for detecting the encoded signals on the power line, at least one decoding means for comparing the detected encoded signal with a preselected encoded signal, and a control circuit for permitting or prohibiting electric power to pass from the electric power supply to the electrically controlled device. The control circuit is operatively connected with the decoding means to be enabled to pass electrical power in response to a coincidence between the encoded signal and the preselected signal.

In accordance with a more limited aspect of the invention, thre is provided an anti-theft control system for motor vehicles which includes a sending module as described above and a receiving module as described above.

A primary advantage of the present invention is that it facilitates installation.

Another advantage of the present invention is that it eliminates radio interference and FCC licensing problems associated with radio transmission control systems.

Still further advantages of the present invention will become apparent upon reading and understanding the following detailed description of the preferred embodiment.

BRIEF DESCRIPTION OF THE DRAWINGS

The invention may take form in various parts and arrangements of parts. The figures are only for purposes of illustrating a preferred arrangement of parts which embody the present invention and are not to be construded as limiting the invention.

FIG. 1 is a schematic diagram of a control circuit or system in accordance with the present invention; and FIGS. 2A, 2B, and 2C illustrate voltage potentials which exist at various points in the preferred embodiment during normal operation.

DESCRIPTION OF THE PREFERRED EMBODIMENT

With particular reference to FIG. 1, the present invention includes a sending module A which imposes an encoded signal on a power line of an electrical power supply B, such as the electrical system of a motor vehicle, and a receiving unit C for receiving the encoded signals and controlling the motor vehicle or other controlled device in response to the encoded signal.

The power supply B in the preferred embodiment includes a twelve volt battery 10 which conveys a DC power signal on a power line 12. The power line is connected with various electrical equipment which draw power from the power supply and tend to drop the voltage of the DC power signal. For example, in a motor vehicle there is conventionally a door switch 14 which is actuated by opening the vehicle door to turn on a dome light or other courtesy lighting 16. As illustrated in FIG. 2A, the DC power signal remains substantially constant until at time 18, the operator opens the vehicle door turning on the courtesy lamp 16. The power drawn by the courtesy lamp drops the voltage of the power signal on the power line 12. The voltage drop at time 18 in FIG. 2A, is a detectable physical phenomenon which may be utilized to initiate various control functions of the present invention.

Motor vehicles and other electrically controlled devices commonly have a key operated ignition switch 20 connected with the power line 12 for selectively connecting the power line with an ignition system 22 including a starter motor, distributor, spark plugs, and the like.

The sending module A includes an encoding means 40 which upon being enabled produces an encoded signal. The encoding means may take various forms such as a frequency encoder, pulse width digital encoder, pulse amplitude digital encoder, or the like. In the preferred embodiment, the encoding means produces a twelve digit pulse width modulated signal which is proceeded by a synchronization pulse. The encoding means 40, in the preferred embodiment, repetatively produces the encoded signal. A reset means 42, such as a timed enable, resets the encoding means after the encoded signal has been produced for a preselected amount of time. The encoding means 40 is connected with an actuating means 50 for selectively actuating the encoding means to produce the encoded signal for the preselected amount time. In the preferred embodiment, the actuating means includes a keyboard 52, such as a twelve key calculator or adding machine keyboard, into which the operator may punch a preselected code. A comparing means 54 compares the code keyed in on the keyboard 52 with a preselected code in a code storage means 56 such as a solid state memory. In response to the keyed code and the stored code matching, the comparing means 54 actuates the encoding means 40. Optionally, other circuitry or means may be provided for limiting the number of entries which may be conveyed from the keyboard 52 to the comparing means 54 in a given duration of time. For example, if the proper code is not keyed in 3 tries, a timer may disconnect the keyboard from the comparing means for a period of 5 minutes. Alternatively, various other actuating means may be utilized, including a mechanical key actuated switch, a magnetically encoded card actuated switch, a fingerprint responsive switch, or the like. In addition to checking the identity of the operator, the actuating means 50 may also check other parameters such as sobriety with a breath analysizer or a reaction time tester, or the like.

Between the encoding means 40 and the power line 12 is a modem or interface means 60 for imposing the encoded signal onto the power signal carried on the power line 12. The exact form of the interface means varies with the nature of the encoder and the power supply. Under some circumstances, the interface means may be a direct electrical connection between the encoding means and the power line. In the preferred embodiment, the interface means includes a current source 62 for applying a current to the power line to alter the voltage of the DC power signal and a gating means 64 controlled by the encoding means 40 for selectively enabling the current source to superimpose the current onto the DC power signal carried on the power line 12. The pulse width modulated signal from the encoding means 40, illustrated in FIG. 2B, causes a plurality of pulses or reductions of a predetermined amplitude in the DC voltage level as illustrated at 66 in FIG. 2A. The width of the pulses is modulated to supply the encoding. The series of modulated pulses are preceeded by a sync pulse 68 which marks the beginning of a set of modulated pulses. Further to the preferred embodiment, the current source is a resistor which analogous to the courtesy lamp 16 causes a monitorable voltage drop in the DC electric power signal on power line 12 when the vehicle is not operating. When the control system is used with other electrically controlled devices, the power line 12 may carry other power signals than a constant DC voltage. For example, the power line 12 in some applications may carry a 60 cycle AC potential. In such circumstances, the appropriate interface means or modem is utilized to superimpose the encoded signal onto the anticipated power signal.

The receiving module C includes a detecting means 70 for separating encoded signals of a predetermined nature from the power signal. In the preferred embodiment with the DC power signal, the detecting means 70 is a voltage level detector which detects sudden changes in the voltage on the power line 12. The detecting means 70 produces an output signal, as illustrated in FIG. 2C, which is a series of pulses whose duration is proportional to the duration of the voltage changes or pulses imposed on the power signal by the sending means.

A decoding means 80 determines whether or not the encoded signal received and detected by the detecting means 70 is the proper encoded signal. In the preferred embodiment, the decoding means includes a comparing means 82 for comparing the received encoded signal with a preselected encoded signal stored in a storage means 84. If there is coincidence between the preselected encoded signal and the received encoded signal, the comparing means 82 of the decoder 80 produces an enable signal. If the received and preselected encoded signals fail to match, no enable signal is produced. Alternately, various other decoding means may be utilized as are appropriate to the nature of the encoded signal selected.

The decoding means 80 may be connected with various control circuits for controlling the electrically controlled device such as the ignition of a motor vehicle. In the preferred embodiment, the decoding means 80 is connected with an ignition control circuit or means 90 for enabling electrical power to pass from the ignition key switch 20 to the automotive ignition 22. The ignition control means 90 may include a high amperage transistor, an SCR, or the like which is gated by the enable signal from the decoding means 80. Alternately, the decoder 80 may be connected with other control means such as a fuel flow control valve, or the like.

Although the control system of the present invention is used for enabling and disabling the controlled electrical device, in the preferred embodiment it further provides an alarm such as a siren or flashing light when an unauthorized us is attempted. To this end, the system includes an alarm control 100 for selectively actuating a siren 102, lights, or the like. The alarm control may be actuated in response to several physical events. One of the events which may actuate the alarm is a drop in the power signal such as at time 18 of FIG. 2A, in response to the courtesy lamp 16 being illuminated. A voltage drop detector including a comparator 110 and a delay means 112 compares the instant power signal or DC voltage on the power line 12 with the power signal a short duration earlier. In response to a sudden change in the magnitude of the power signal, the comparator 110 produces an alarm actuating signal. To allow an authorized operator sufficient time to position himself within the car and enter his code on the keyboard 52, a delay timer means 114 is connected between the comparator 110 and the alarm control 100. This provides a delay of a selectable period, e.g. 30 seconds, before the alarm control is actuated. The alarm control has a disable means 120 which is connected by a latch 122 with the enable output of the decoder 80 such that the alarm control is disabled in response to the preselected encoded signal being received. Optionally, other physical phenomion may also be monitored. For example another decoder may be connected with the detector means 70 for decoding the encoded signals. Optionally, in response to receiving a signal other than the preselected encoded signal, the decoding means may produce an alarm actuating signal. Other sensors such as an impact sensor, tilt sensor, or the like may generate an alarm actuating signal. The other sensors may be connected directly with the alarm control or with the delay timer means 114.

Optionally, a second receiving module D may be connected with the power line for controlling another portion of the vehicle or other controlled device. For example, the second receiving module may enable a gas line flow control valve in response to receiving the same preselected signal as the first receiving module C. This enables multiple anti-theft controls to be connected with various parts of the vehicle by connecting each control with the nearest power line. Other anti-theft controls that may be connected with a receiving module include a hood lock, trunk lock, starter motor control, alarm control, or the like.

The invention has been described with reference to the preferred embodiment. Obviously, alterations and modifications will occur to others upon reading and understanding the preceeding detailed description of the preferred embodiment. For example, the sending module may include a plurality of encoders each actuated by a different keyboard code to send a different encoded signal. The receiving means may have a similar plurality of decoders for decoding each of the plurality of the signals as well as a decoder for decoding all of the possible encoded signals. In this manner, a plurality of authorized operators could gain access to different levels of the control device. For example, in a motor vehicle, all of the preselected encoded signals could enable the ignition control such that all authorized operators could operate the vehicle plus each individual preselected encoded signal could be decoded to actuate an odometer, operating time clock, or other means for measuring each operator's usage of the controlled vehicle, to actuate selectively a speed governor to limit the speed at which some authorized operators may drive the vehicle, or the like. Numerous other alternate embodiments will immediately suggest themselve when the present invention is used with other well known electrically controlled devices. It is out intention that the invention include all such modifications and alterations insofar as they come within the scope of the appended claims or the equivalents thereof.

Having thus described the preferred embodiments of our invention, we now claim our invention to be:

1. A control system for an electrically controlled device, the control system comprising:
  (a) a battery for supplying DC electric power;
  (b) a power line operatively connected to the battery for conveying DC electric power to the controlled device;
  (c) a DC powered sending module electrically connected with the power line to receive DC operating power therefrom, the sending module including:
    (i) an encoding means for selectively generaing a preselected encoded electrical signal, the encoding means being operatively connected with the power line to receive operating power therefrom,
    (ii) an actuating means for selectively actuating the encoding means to generate the encoded signal, the actuating means being operatively connected with the encoding means and being operatively connected with the power line to receive operating power therefrom, and
    (iii) interface means for superimposing the encoded signal onto the DC electric power on the power line, the interface means being operatively connected with the encoding means to receive the encoded signal therefrom and being operatively connected with the power line to supply the encoded signal thereto and to receive operating power therefrom;
  (d) at least one DC powered receiving module electrically connected with the power line to receive DC operating power therefrom, each receiving module including:
    (i) a detector means for detecting and separating the encoded signal from the DC electric power, the detector means being operatively connected with the DC power line to receive the superimposed encoded signal and DC power therefrom and to receive operating electrical power therefrom,
    (ii) a decoding means for comparing the detected encoded signal with at least one preselected signal, the decoding means being operatively connected with the detector means to receive the encoded signal therefrom and being operatively connected with the power line to receive operating power therefrom, and,
    (iii) a control circuit for controlling the electrically controlled device, the control circuit being operatively connected with the decoding means to enable the electrically controlled device to be operated with the DC power from the control line in response to coincidence between the detected encoded signal and the preselected signal and being operatively connected with the power line to receive operating power therefrom.

2. The control system as set forth in claim 1 wherein the electrically controlled device is a motor vehicle ignition.

3. The control system as set forth in claim 1 wherein in the sending module, the actuating means includes a keyboard having a plurality of keys on which codes may be entered and a comparing means for comparing an entered code with a preselected code, the comparing means enabling said encoding means in response to the entered and preselected codes matching each other.

4. The control system as set forth in claim 1 wherein said encoding means is a digital encoder, whereby the encoded signal is a series of pulses.

5. The control system as set forth in claim 4 wherein in the sending module, the interface means includes a current source which is enbled by the digital encoder to apply current pulses to the power line in response to the encoder pulses.

6. The control system as set forth in claim 5 wherein in the receiving module, the detector means is a voltage level detector.

7. The control system as set forth in claim 4 wherein the interface means includes a switching means which is operatively connected with a digital encoder to be gated conductive and non-conductive thereby and a resistor which is connected in series with the switching means such that the switching means selectively applies a resistive load across the battery.

8. The control system as set forth in claim 4 wherein the sending module the digital encoder produces a pulse width modulated encoded signal.

9. The control system as set forth in claim 4 wherein in the receiving module, the decoding means includes a digital decoder for comparing the detected digitally encoded signal with at least one preselected digitally encoded signal.

10. An anti-theft control system for motor vehicles having a DC electric battery and at least one power line operatively connected with the battery on which DC power is conveyed, the anti-theft control system comprising:
 (a) a sending module which is electrically connected with the power line, the sending module including:
  (i) an encoding means for producing an encoded signal,
  (ii) an actuating means for selectively actuating the encoding means to produce the encoded signal, the activating means being operatively connected with the encoding means, and,
  (iii) an interface means for imposing the encoded signal on the power line, the interface means being operatively connected with the encoding means and the power line; and,
 (b) at least one receiving module which is operatively connected with said power line, the receiving module including:
  (i) a detector means for detecting an encoded signal on the power line, the detector means being operatively connected with the power line,
  (ii) a decoding means for decoding the detected signal, the decoding means being operatively connected with the detector means, and,
  (iii) a control circuit for selectively enabling and disabling the motor vehicle to be operated, the control circuit being operatively connected with the decoding means such that the control circuit disables operation of the motor vehicle except in response to the decoder means decoding a preselected encoded signal.

11. The anti-theft control system as set forth in claim 10 wherein the sending module actuating means includes a keyboard into which a plurality of codes can be entered and comparing means for comparing the entered code with a preselected code, the comparing means being connected with the encoding means to enable the encoding means when the entered and preselected codes match.

12. The anti-theft control system as set forth in claim 11 wherein the keyboard is disposed in a passenger compartment of the motor vehicle.

13. The anti-theft control system as set forth in claim 10 wherein the receiving module further includes an alarm control means for selectively actuating an alarm, the alarm control means including an alarm disable means operatively connected with the decoding means for disabling the alarm in response to the detection of the preselected encoded signal.

14. The anti-theft control system as set forth in claim 13 wherein the receiving module further includes means for sensing a potential drop on the power line, the potential drop sensing means being operatively connected with the power line to produce an actuating signal in response to a voltage drop, a delay means operatively connected with the voltage drop sensing means for delaying the actuating signal, the delay means being operatively connected with the alarm control means such that the alarm control is actuated to cause the alarm to be set off after the delay.

15. The anti-theft control system as set forth in claim 10 wherein the receiving module decoding means further decodes detected encoded signals and produces an alarm disable signal in response to the detected and preselected encoded signals matching, the decoding means being operatively connected with the alarm control to stop the alarm control from actuating the alarm.

16. The anti-theft control system as set forth in claim 10 wherein the motor vehicle includes a key operated ignition switch located within the passenger compartment and an ignition circuit controlled by the key operated ignition switch, the ignition circuit being disposed in an engine compartment and wherein the receiving module control circuit is operatively connected with the ignition circuit for enabling and disabling the ignition circuit to operate.

17. The anti-theft control system as set forth in claim 16 wherein the receiving module control circuit includes a switching means disposed in series with the ignition circuit and the key operated ignition switch such that the ignition switching means selectively prohibits or allows electric potential to be received by the ignition circuit.

18. The anti-theft control system as set forth in claim 10 wherein the sending module encoding means is a digital encoder and the receiving module decoding means is a digital decoder.

19. The anti-theft control system as set forth in claim 18 wherein the sending module digital encoder is a pulse width modulated encoder and the receiving module digital decoder is a pulse width modulated signal decoder.

20. An anti-theft control system for motor vehicles having a DC electric battery and at least one power line on which DC electric operating power is conveyed from the battery to a key operated switch, an ignition circuit, and other vehicular equipment which operates on DC electric power, the anti-theft control system comprising:
 (a) a sending module which is electrically connected with the power line, the sending module including:
  (i) a pulse width modulator encoder for producing a digitally encoded signal,
  (ii) a keyboard into which a plurality of codes can be entered,
  (iii) a comparing means for comparing the keyboard entered code with a preselected code, the comparing means being operatively connected with the encoder to enable the encoder to produce the digitally encoded signal when the keyboard entered and preselected codes match,
  (iv) an interface means for imposing the digitally encoded signal on the power line, the interface means being operatively connected with the encoder and the power line; and,
 (b) a receiving module which is operatively connected with said power line, the receiving module including:
  (i) a digital detector for detecting digitally encoded signals on the power line,
  (ii) a decoding means for comparing the detected, digitally encoded signal with a preselectedd digitally encoded signal, the decoding means being operatively connected with the detector means, and, (iii) an ignition control circuit for selectively enabling and disabling the motor vehicle ignition circuit, the ignition control circuit being operatively connected with the decoding means for disabling the ignition circuit except in response to the decoder means decoding the preselected digitally coded signal, whereby the vehicle is disabled until the preselected code is entered on the keyboard causing the preselected digitally encoded signal to be applied to the power line which, in turn, causes the ignition control circuit to enable the ignition circuit to function normally to start and operate the vehicle.

* * * * *